United States Patent [19]
Kloeppel et al.

[11] Patent Number: 6,004,036
[45] Date of Patent: Dec. 21, 1999

[54] FLUID DYNAMIC BEARING CARTRIDGE DESIGN INCORPORATING A ROTATING SHAFT

[75] Inventors: Klaus D. Kloeppel, Watsonville; Anthony J. Aiello, Aptos; Steven C. Knoche, Corralitos, all of Calif.

[73] Assignee: Seagate Technology, Inc., Scotts Valley, Calif.

[21] Appl. No.: 09/107,239

[22] Filed: Jun. 30, 1998

[51] Int. Cl.$^6$ ....................................................... F16C 32/06
[52] U.S. Cl. ............................................ 384/107; 384/112
[58] Field of Search .................................... 384/100, 107, 384/112, 111, 110, 114, 113

[56] References Cited

U.S. PATENT DOCUMENTS

| | | | |
|---|---|---|---|
| 4,557,610 | 12/1985 | Asada et al. | 384/107 |
| 4,573,807 | 3/1986 | Asada et al. | 384/107 X |
| 5,357,163 | 10/1994 | Minakuchi et al. | 384/112 X |
| 5,417,507 | 5/1995 | Uno et al. | 384/107 |
| 5,559,382 | 9/1996 | Oku et al. | 384/112 X |
| 5,675,200 | 10/1997 | Hayashi | 384/107 X |

*Primary Examiner*—Thomas R. Hannon
*Attorney, Agent, or Firm*—Flehr Hohbach Test Albritton & Herbert LLP

[57] ABSTRACT

A fluid dynamic bearing cartridge including a sleeve and a counterplate captured within a shoulder on the sleeve and including a threaded mounting extension for mounting the assembly from a base or the like. A rotating shaft is incorporated within the sleeve; the shaft includes a thrust plate which rotates in a recess defined between the counterplate and the sleeve. To incorporate this assembly into a disc drive or the like, the threaded mounting extension only needs to be mounted within a base, with a nut screwed over the threaded mounting. The base typically includes a raised portion; the sleeve is cantilevered from this base for further stability and eliminate the possibility of vibration of the shaft and sleeve with rotation of the shaft. The end of the shaft distal from the threaded mounting supports a hub which in turn supports a backiron and magnet. The base supports a stator aligned with the magnet; energization of the stator will cause rotation of the hub and the shaft.

12 Claims, 4 Drawing Sheets

FLUID DYNAMIC BEARING CARTRIDGE DESIGN INCORPORATING A ROTATING SHAFT

FIELD OF THE INVENTION

The invention relates to the field of hydrodynamic bearing assembly, and especially for an assembly incorporating a rotating shaft surrounded by a fixed sleeve.

BACKGROUND OF THE INVENTION

Rotating shaft designs for bearing cartridges to be used in the assembly of motors, actuators and the like are highly desirable, because the shaft can frequently be made smaller, requiring less power to rotate the shaft. Such cartridges as previously developed typically have a spindle mounted by means of two ball bearing systems to a shaft disposed in the center of the hub. One of the bearings is typically located near the top of the spindle and the other near the bottom. These bearings allow for rotational movement between the shaft and the hub while maintaining accurate alignment of the hub to the shaft. The bearings themselves are normally lubricated by grease or oil.

The conventional ball-bearing system described above is prone, however, to several shortcomings. First is the problem of vibration generated by the balls rolling on the raceways. Ball bearings run under conditions that generally result in some measure of physical contact between raceways and balls, this in spite of the lubrication layer provided by the bearing oil or grease. Hence, bearing balls running on the generally even and smooth, but microscopically uneven and rough raceways, transmit this surface structure as well as their imperfections in sphericity in the form of vibration to the shaft. This vibration limits the overall performance of the disc drive system.

Another problem is related to the damage due to shocks to the bearing cartridge in turn show up as a force across the bearing system. Since the contact surfaces in ball bearings are very small, the resulting contact pressures may exceed the yield strength of the bearing material and leave permanent deformation and damage on raceways and balls.

Moreover, mechanical bearings are not always scalable to smaller dimensions, a problem in many rotating shaft mechanical systems which are being scaled down in size while operated at high speeds and greater rates of acceleration.

As an alternative to conventional ball bearing spindle systems, researchers are developing a hydrodynamic bearing. In these types of systems, lubricating fluid—either gas or liquid—functions as the actual bearing surface between a stationary base or housing and the rotating spindle or rotating hub and the stationary surrounding portion of the motor. For example, liquid lubricants comprising oil, more complex ferromagnetic fluids, or even air have been utilized for use in hydrodynamic bearing systems. The reason for the popularity of the use of air is the importance of avoiding the outgassing of contaminants into the sealed area of the head disc housing. However, air does not provide the lubricating qualities of oil. Its low viscosity requires smaller bearing gaps and therefore higher tolerance standards to achieve similar dynamic performance.

Many prior art hydrodynamic bearing assemblies frequently require large or bulky structural elements for supporting the axial and radial loads, as such hydrodynamic bearings do not have the inherent stiffness which results from mechanical bearing assemblies. It is difficult to scale the structural support elements to fit within smaller disc drive dimensions currently in consumer demand, as well as other small scale mechanical systems. In other instances, hydrodynamic bearing assemblies suffer from the disadvantages of requiring extremely tight clearances and alignments; this burden makes it difficult to manufacture such assemblies since even a small deviation or aberration can lead to faulty bearings.

Most known hydrodynamic bearing designs are based on a fixed shaft and rotating surrounding sleeve. However, by switching to a rotating shaft, significant improvements in power consumption and vibration response could be achieved with no trade-offs in performance. The power consumption would be decreased by using a smaller diameter shaft which has a smaller oil shearing radius, thus requiring less torque to rotate. This smaller diameter shaft can be used because the stability of the design is less dependent on the shaft stiffness than when the shaft is stationary and cantilevered or supported from the base.

The vibration performance could also be improved significantly in a rotating shaft design when the angular stiffness of the base-shaft system increases when it is replaced by a base-sleeve system. A design utilizing a fixed sleeve supported from a base has a much higher angular stiffness than one using a shaft cantilevered from a base. Therefore, the development of an easily assembled rotating shaft cartridge incorporating a fluid dynamic bearing is highly desirable.

SUMMARY OF THE INVENTION

It is therefore an objective of the present invention to provide a hydrodynamic bearing cartridge which is simple in design and assembly, yet supports a rotating shaft within a fixed sleeve.

It is a further objective of the invention to provide a rotating shaft cartridge design which can be easily scaled for incorporation within a small scale system such as a computer disc drive system.

Yet another objective of the invention is to provide a design which is assembled from a limited number of parts so that assembly time and costs is minimized, and the need for machining a number of parts to close tolerances is minimized.

Yet another objective of the invention is to provide a hydrodynamic bearing cartridge design utilizing a rotating shaft and a sleeve cantilevered from a base so that the diameter of the rotating shaft may be reduced, minimizing power consumption needed to rotate the shaft.

These and other objectives of the present invention are achieved in a fluid dynamic bearing cartridge including a fixed sleeve and a counterplate captured within a shoulder on the sleeve; the counterplate has a threaded mounting extension for mounting the assembly from a base or the like. A rotating shaft is supported for rotation within the sleeve by a fluid bearing; the shaft also includes a thrust plate which rotates in a recess defined between the counterplate and the sleeve, supported by the fluid bearing. To incorporate this cartridge assembly into a disc drive or the like, the threaded mounting extension only needs to be mounted on a base, with a nut screwed over the threaded mounting. The base typically includes a raised portion; the sleeve is cantilevered from this base for further stability and to eliminate the possibility of vibration of the sleeve and shaft with rotation of the shaft. The end of the shaft distal from the threaded mounting supports a hub which in turn supports a backiron and magnet. The base supports a stator aligned with the magnet; energization of the stator will cause rotation of the hub and the shaft.

Other features and advantages of the present invention will be apparent to a person of skill in the art who studies the description of a preferred embodiment given below in conjunction with the accompanying drawings.

DETAILED DESCRIPTION OF A PREFERRED EMBODIMENT

In the following description, a hydrodynamic bearing cartridge incorporating a rotating shaft is disclosed. It is also shown, by way of example, incorporated in a rotating shaft spindle motor which carries a hub for supporting one or more discs, a design which is especially useful in a disc drive computer system. The present invention modifies an existing fixed shaft design to make it very simple to utilize a rotating shaft in a spindle motor, with the rotating shaft supporting the hub for rotation. Adopting this approach allows the sleeve to be fixed, and supported directly from the base as will be shown below. This means that the shaft can be made thinner, reducing the power requirements to rotate the shaft. Further, because the sleeve is supported from the base, the sleeve and shaft combination is very stable, reducing the likelihood of vibration in the system. Of course, the cartridge of this invention is not limited to uses in such motors or even in motors at all.

Figure 1:
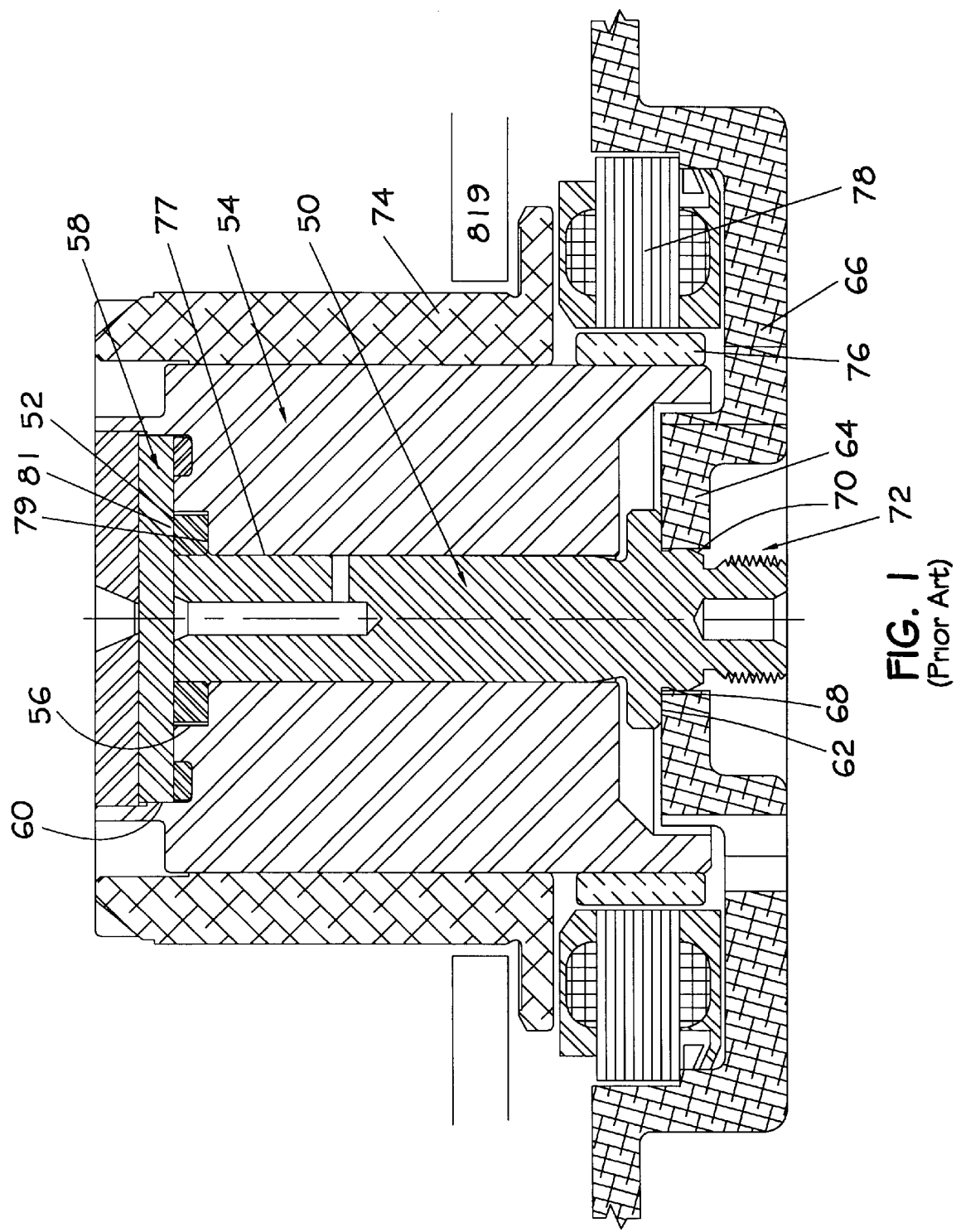
FIG. 1 is a vertical sectional view of a known, fixed shaft fluid dynamic bearing incorporated in a spindle motor useful in a disc drive.

FIG. 1 shows a prior art spindle motor including a central fixed shaft 50 having a thrust plate 52 on one end. The shaft 50 is fixed relative to the rotating sleeve 54; the thrust plate 52 sits within a recess 56 defined by the sleeve 54 and a counterplate 58 supported on the sleeve. It can be seen that the counterplate 58 is fixed in place on the sleeve by being pressed or similarly fixed inside a shoulder 60 on the sleeve 54. At the opposite end of the shaft 50, the shaft includes a shoulder 62 which rests on an upraised portion 64 of the base 66 in which the motor is mounted. A shaft extension 68 extends through an opening 70 in the base 66; and a threaded mounting end 72 of the shaft receives a nut (not shown) which fixes the shaft in place within the base. A hub 74 is supported on the outside of the sleeve 54, and a magnet 76 is located on the same surface of the sleeve and aligned with a stator 78 supported from the base casting 66. Energization of the stator establishes a field which interacts with the magnet 76 to cause rotation of the hub. One or more discs, 19 are supported on the surface of the hub. Fluid fills the gap 77 between the surfaces of the shaft 50 and the surrounding sleeve 54 and in gaps 79, 81 between surfaces of thrust plate 52 and facing surfaces of the sleeve 54 and the counterplate 58. Appropriate pumping grooves are also provided along one or more surfaces of the shaft and thrust plate to maintain the fluid dynamic bearing as is well known in this technology. The specific layout and location of such grooves is not an aspect of this invention.

It is readily apparent to those skilled in the art, that because a transducer (not shown) of a disc drive computer system flies closely over the surface of each disc 19, the motor and hub must be very stable. In a fixed shaft design, to achieve this goal, a shaft 50 of substantial diameter is used. The present invention is intended to provide a motor which achieves the goals of the design of FIG. 1 providing a rotating shaft and hub designed so that the size of the disc surface is optimized, while still providing a motor which is very stable and not susceptible to vibration. Further, the motor and cartridge to be described with respect to FIGS. 2–4 is simple to assemble, and incorporates a rotating shaft of relatively narrow diameter so that a minimal amount of power is used to spin the shaft and the hub it supports.

Figure 2:
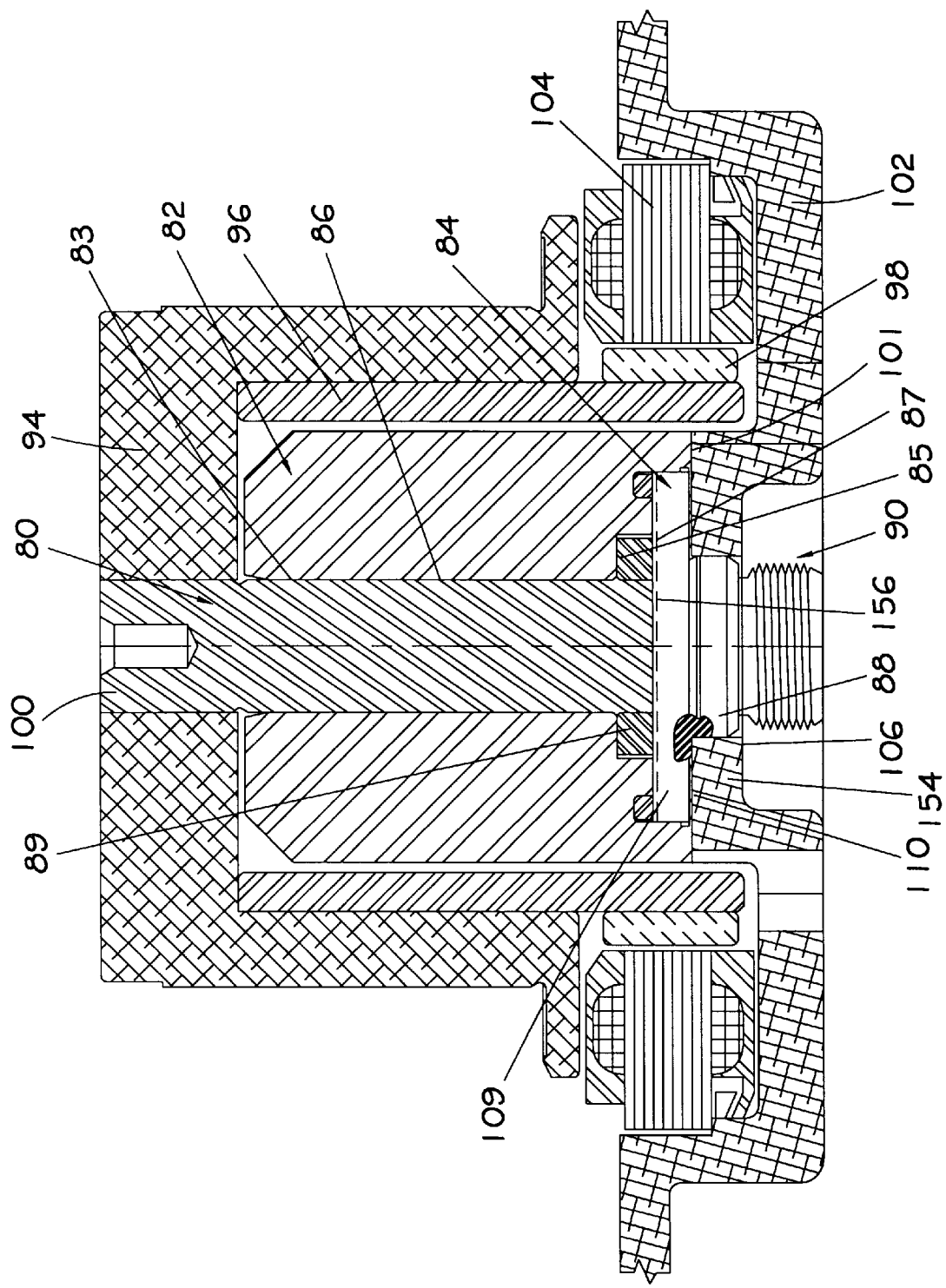
FIG. 2 is a vertical sectional view of a motor adapted for use in a disc drive and incorporating the features of the rotating shaft cartridge of the present invention.

Referring specifically to FIG. 2, the design shown herein incorporates a rotating shaft 80 which rotates within a sleeve 82. The sleeve 82 cooperates with an integral, single piece threaded counterplate 84 (shown in FIG. 4) for stability and to define the gap which holds fluid to support shaft 80 for rotation. The threaded counterplate 84 includes in a single integrated piece a flange 109 on which the sleeve 82 will rest, a base insert extension 88, and a threaded mounting end 90. A fluid dynamic bearing is established in the gap 83, 86 between the sleeve 82 and the rotating shaft 80 and the gaps 85, 87 between the thrust plate 89 supported on the shaft and the sleeve 82 and the counterplate 84. The shaft 80 and thrust plate 89 are supported for rotation by fluid (gas or liquid) in the gaps 83, 85, 86, 87 between the surfaces of the shaft 80 and thrust plate 89, and the corresponding inner surfaces of the sleeve 82 and the threaded counterplate 84, all in accordance with the known technology in the field of fluid dynamic bearings.

To complete the motor of FIG. 2, a hub 94 which is preassembled with backiron 96 and magnet 98 is mounted on a first end 100 of the shaft 80 distal from the thrust plate 89. The assembled combination is then inserted in the base 102 which has already been assembled together with a stator 104. The threaded extension 90 extends through an opening 106 in the base 102, and a nut (not shown) is threaded on the extension 90 to fix the motor in place.

Figure 3:
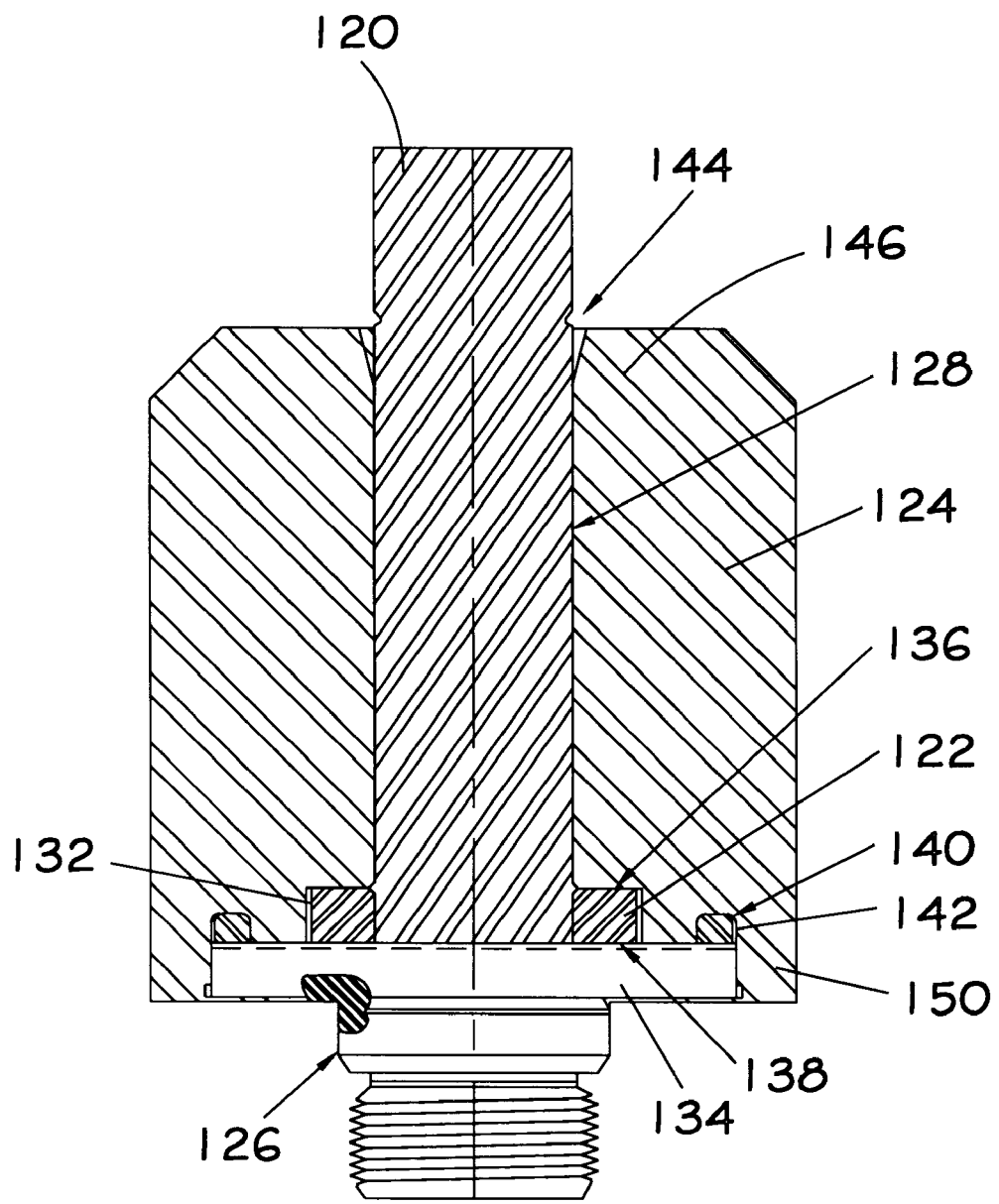
FIG. 3 is a vertical sectional view of a motor cartridge which, among other things may be incorporated in motors of the type shown in FIG. 3.
Figure 4:
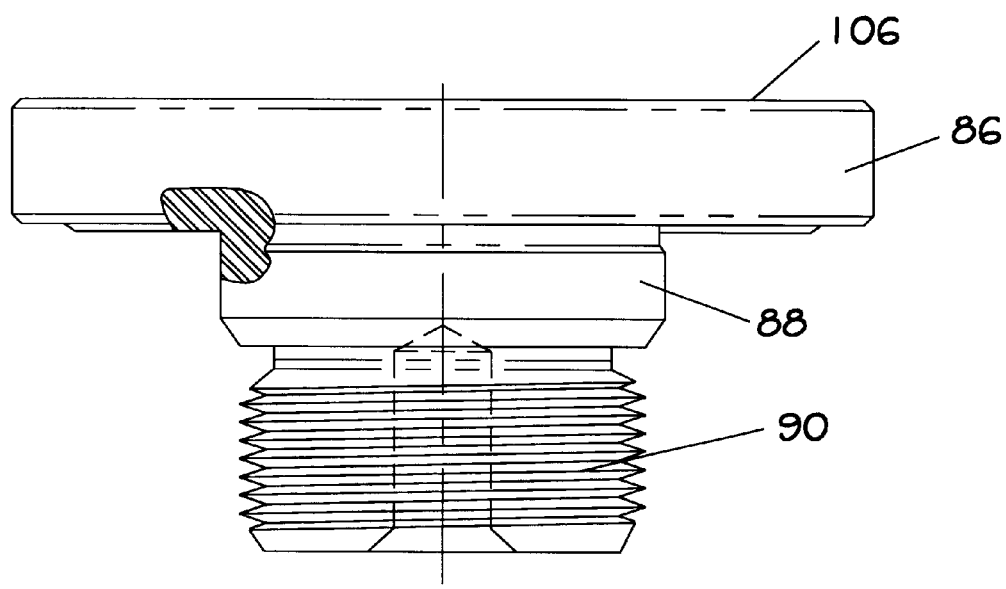
FIG. 4 is a vertical sectional view of the threaded counterplate used in the cartridge of this invention.

The basis of establishing this motor, as well as many other potential designs which require a stable easily rotated shaft supported by a hydrodynamic bearing is the bearing cartridge of FIG. 3. The cartridge comprises three primary elements: The shaft 120 and thrust plate 122; the sleeve 124; and the threaded counterplate 126. The rotating shaft 120 combines with the sleeve 124 to define a journal bearing 128 which is a primary source of support for rotation of the shaft radially. The thrust plate 122 rotates in a recess generally indicated at 132 defined between the sleeve 124 and the counterplate 134. Thus the thrust plate 122 forms thrust bearings 136 with the sleeve 124 and thrust bearing 138 with the counterplate 134 to provide axial stability for the shaft 120.

Since fluid must be maintained in the gaps of the journal bearing 128 and the thrust bearings 136, 138 an o-ring seal 140 is incorporated in a recessed gap 142 of the sleeve 124 with the o-ring seal being pressed into place by the counterplate 134. This prevents any leakage of fluid from the thrust bearings 136, 138. Fluid of course is also the support for the journal bearing 128; thus meniscus zone 144 is defined at an open end of the shaft 120 and inclined or angled face 146 of the sleeve 124 to prevent any loss of fluid from the journal bearing.

It should further be seen that the assembly of this bearing cartridge is very direct and straight forward due to its design.

To assemble the cartridge, the sleeve 124 can simply be held inverted from the orientation shown in FIG. 3 and the shaft and thrust plate combination 120, 122 are assembled preferably by an interference fit and slipped into the opening for the shaft. Then the o-ring of the o-ring seal 140 is slipped into the recess 142, and the threaded counterplate 122 is pressed inside the shoulder 150 of the sleeve 124. A vacuum filling method or the like shall be used to incorporate fluid into the journal bearing 128 and thrust bearings 136, 138 completing the cartridge assembly.

The threaded counterplate as has already been described above significantly speeds the assembly process by providing an integration into a single piece of the counterplate 134, the base mounting extension 88 and threaded mount piece 90. These pieces make it very easy to incorporate the cartridge into a spindle motor as shown in FIG. 2 or many other end use devices.

Of course, other means of attaching the mounting extension to the base are readily available, such as an interference fit, retaining clip or the like. It is also apparent that this motor can be easily accepted into existing designs which were established to accept stationary shaft fluid dynamic bearing motors. This goal is achieved by providing the integral, threaded counterplate shown in FIG. 4, which interfaces with the upraised portion 154 of the drive base to locate and tie down the motor that is now separated from the shaft. The upper surface 156 of the counterplate 84 now faces the base of the rotating shaft as well as the facing surfaces of the thrust plate 89 so that the rotating shaft and thrust plate smoothly rotate over the surface of the counterplate.

As noted above, by adopting this rotating shaft design, the rotating shaft itself may be made thinner than the standard fixed shaft. This leads to a reduction in power consumption; it is readily apparent that since the sleeve 82 is not rotating, its shoulder 101 may rest directly on the base; also, the outer radial periphery of the counterplate 84 is fitted within the shoulder 150 of the sleeve 124 and the radially extending outer surface 110 of the counterplate 84 rests on and threaded mounting end 90 extends through the upraised base 154. Therefore, a very stable interface between the sleeve, counterplate and base is established. The rotating shaft 80 which supports the hub 94 for rotation, can be made relatively thinner, because of the stiffness established by the base-sleeve system. The sleeve 82 being cantilevered from the base 102 has an inherently much higher angular stiffness than the shaft cantilevered from the base in a fixed shaft system.

Other features and advantages of the present invention may be apparent to a person of skill in the art who studies the present invention disclosure. Therefore, the scope of the present invention should be limited only by the following claims.

What is claimed is:

1. An improved fluid dynamic bearing cartridge comprising:
    a fixed sleeve surrounding a rotating shaft and defining a fluid dynamic bearing between facing surfaces of said shaft and said sleeve; and
    a threaded counterplate supporting said sleeve at an outer radial periphery of said counterplate and said counterplate having a surface facing an end of said shaft to define a fluid dynamic bearing with said shaft to allow for rotation of said shaft relative to said counterplate and said sleeve.

2. A cartridge as claimed in claim 1 wherein said counterplate includes an integral extension extending axially away from said shaft and an integral threaded mounting end for receiving a nut for fastening said extension to a base.

3. A cartridge as claimed in claim 2 further comprising a thrust plate on said end of said shaft and rotating in a recess defined by said sleeve and said counterplate and defining a portion of said fluid dynamic bearing between surfaces of said thrust plate, said sleeve and said counterplate to establish stable rotation of said shaft relative to said sleeve and said counterplate.

4. A cartridge as claimed in claim 2 further comprising a rotating hub for supporting one or more discs in a disc drive, said hub being supported from a first end of said shaft distal from said end of said shaft facing said counterplate;
    wherein said hub supports a backiron extending parallel to said sleeve and beyond an axial end of said hub defining a region where said discs are supported, said extension of said backiron beyond said hub supporting a magnet located to face a stator supported from said base to form said cartridge which causes rotation of said hub and said shaft relative to said sleeve and said base.

5. A cartridge as claimed in claim 1 wherein said outer radial periphery of said counterplate is fitted within a shoulder of said sleeve so that said counterplate is integrated with said sleeve to define a chamber for said shaft and a thrust plate on said end of said shaft.

6. A cartridge as claimed in claim 5 wherein said shaft terminates in said end having a surface parallel to said counterplate and separated by a gap from said counterplate so that a portion of said fluid dynamic bearing is defined between said end surface and said counterplate.

7. A cartridge as claimed in claim 6 wherein said thrust plate defines at least one radially extending surface parallel to said counterplate and separated by a gap from said counterplate so that a portion of said fluid dynamic bearing is formed between said counterplate and said thrust plate.

8. An improved fluid dynamic bearing cartridge comprising:
    a fixed sleeve surrounding a rotating shaft and defining a fluid dynamic bearing between facing surfaces of said shaft and said sleeve, and
    a stabilizing means for supporting said sleeve and for defining a fluid dynamic bearing with an end of said shaft to allow for rotation of said shaft relative to said sleeve and establishing a stable interface between said sleeve, said counterplate and a base.

9. An improved fluid dynamic bearing cartridge as claimed in claim 8 further comprising means integral with said stabilizing means for fastening said stabilizing means to the base.

10. An improved fluid dynamic bearing cartridge as claimed in claim 8 wherein said stabilizing means includes an integral extension extending axially away from said shaft.

11. An improved fluid dynamic bearing cartridge as claimed in claim 10 wherein said stabilizing means includes integral threaded mounting end for receiving a nut which screws over the threaded mounting and fastens said extension to a base.

12. An improved fluid dynamic bearing cartridge as claimed in claim 10 wherein said stabilizing means includes a means of attaching the extension to the base.

* * * * *